Feb. 8, 1966  P. J. PERRY  3,233,325
EJECTOR TYPE CULINARY UTENSIL
Filed July 28, 1964
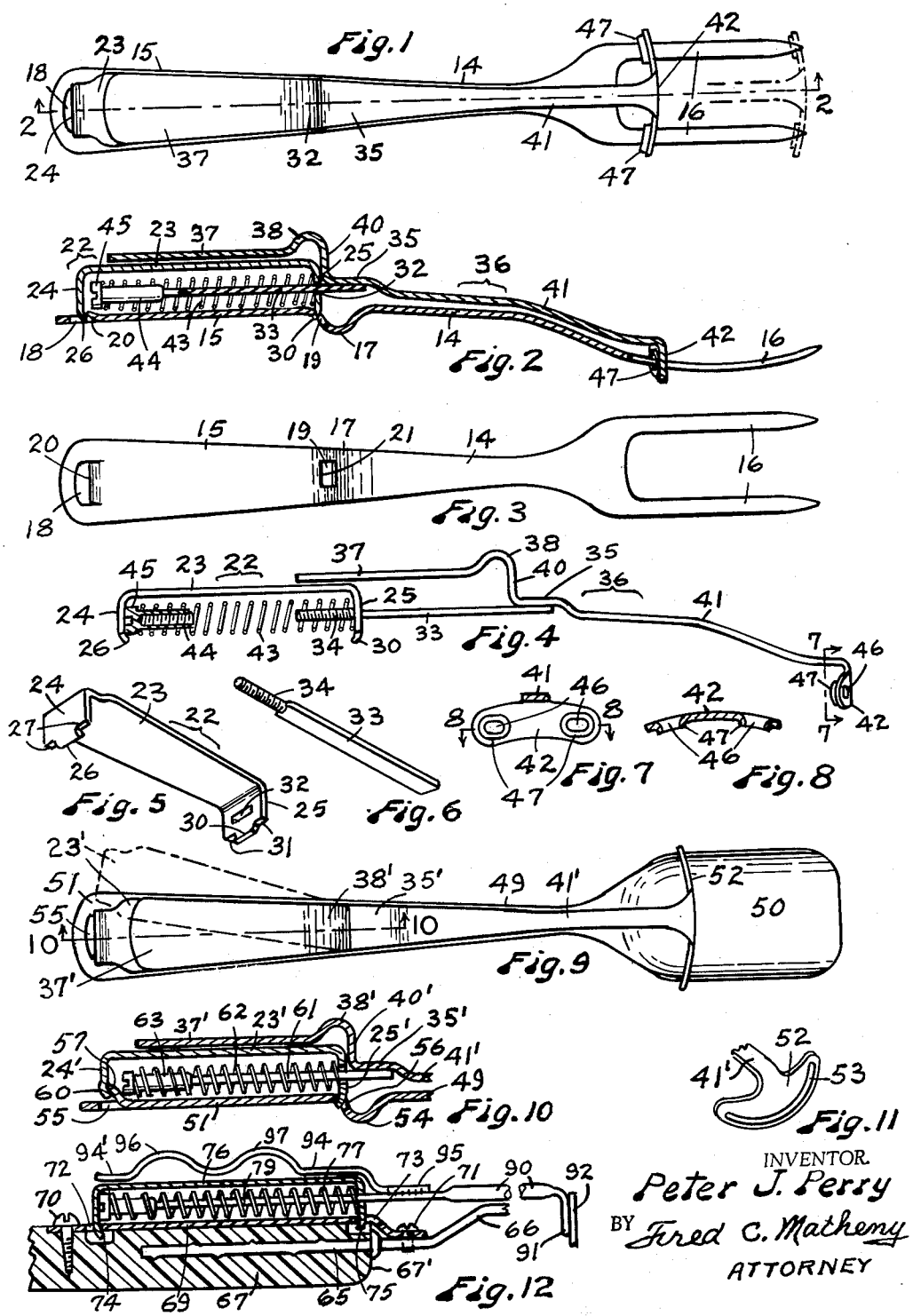
INVENTOR.
Peter J. Perry
BY Fred C. Matheny
ATTORNEY

United States Patent Office 3,233,325
Patented Feb. 8, 1966

3,233,325
EJECTOR TYPE CULINARY UTENSIL
Peter J. Perry, 1900 18th Ave. S., Seattle, Wash.
Filed July 28, 1964, Ser. No. 385,579
5 Claims. (Cl. 30—129)

My invention relates to an ejector type culinary utensil in the nature of a fork or spoon and an object of my invention is to simplify and render more efficient forks and spoons of the type used in homes and in public eating places for serving up and handling food and which are provided with means for ejecting food or like material from the tines or bowls thereof.

Another object is to provide an ejector type culinary utensil in the form of a fork or spoon which is neat and attractive in appearance, not expensive to manufacture, easy to use, and one in which the ejector member is normally retracted and held retracted by a spring.

Another object is to provide an easily cleaned and sanitary ejector fork or spoon in which the ejector mechanism can be quickly and easily detached from and replaced on the fork or spoon thereby making possible easy and efficient and thorough cleaning of the ejector mechanism and the utensil with which it is connected.

Another object is to provide an ejector type fork or spoon having spring retracted ejector mechanism in which an ejector spring is readily removable for the purpose of replacement.

Other objects of my invention will be apparent from the following description and accompanying drawings.

In the drawings:

FIGURE 1 is a top plan view of an ejector type fork constructed in accordance with my invention, showing by full lines, the ejector mechanism in a retracted position and indicating by dot and dash lines a maximum extended position of a pusher member.

FIG. 2 is a view in longitudinal section, with parts in elevation, taken substantially on broken line 2—2 of FIG. 1, and showing said ejector type fork.

FIG. 3 is a top plan view of the fork shown in FIGS. 1 and 2 with the ejector mechanism removed therefrom.

FIG. 4 is a partially exploded view in side elevation, with parts in section, of the ejector mechanism, showing the same detached and partly dis-assembled.

FIG. 5 is a detached perspective view of one part of the ejector mechanism.

FIG. 6 is a detached perspective view of another part of said ejector mechanism.

FIG. 7 is a view looking in the direction indicated by broken line 7—7 of FIG. 4 and showing a pusher member.

FIG. 8 is a sectional view taken on broken line 8—8 of FIG. 7.

FIG. 9 is a plan view showing ejector means of modified form applied to a spoon.

FIG. 10 is a fragmentary view in longitudinal section taken on broken line 10—10 of FIG. 9, parts being shown in elevation.

FIG. 11 is a fragmentary perspective view of a pusher member of the type used for spoons.

FIG. 12 is a fragmentary longitudinal sectional view, with parts in elevation, showing a form of my ejector means which is particularly well adapted to be incorporated into the construction of culinary utensils of larger size, such as barbecue forks and spoons.

Like reference numerals refer to like parts throughout the several views.

The term "outer end," as herein used refers to the tine or bowl end of the utensil, the term "inner end" to the handle part.

FIGS. 1 to 8 show my invention applied to a fork of the type commonly used for serving or dishing up food. Said fork comprises a shank 14 which terminates at one end in a flat metal handle 15 and at the other end in preferably two tines 16. A transverse, downwardly arched bend or depression 17 formed at about the location where the shank 14 and handle part 15 join, serves as a finger engaging part, as hereinafter explained. Two longitudinally spaced apart perforations 18 and 19 are provided in the handle 15. The perforation 18 is positioned near the inner end of the handle. The perforation 19 is preferably formed in the downwardly curving part of the bend 17. A lug or catch member 20 is formed at one edge of the opening 18, preferably by upward displacement of the metal at this location. Positioning the opening 19 in the downwardly curving inner wall of the bend part 17 facilitates use of an edge 21 of said opening 19 for catch purposes in cooperation with the lug 20 in detachably receiving and holding a spring retaining clip indicated generally by 22 in FIG. 5.

The spring retaining clip 22 is formed of flat metal which has at least a slight amount of resilience. It comprises a straight, flat main part of sufficient length to span the distance between the two openings 18 and 19 and two relatively short end parts 24 and 25 integral with and extending in the same direction substantially at right angles from the respective ends of the main part 23. The end part 24 terminates in an inwardly curving catch member or pawl 26, which is of less width than said end part 24 so as to provide two stop shoulders 27 at opposite sides of said pawl 26. Similarly the end part 25 terminates in a catch member or pawl 30 of less width than said part 25 so as to provide two stop shoulders 31 at opposite sides of said pawl 30. A slot 32 is formed in the end part 25 to slidably receive and guide a spring supporting tongue 33. The major portion of said tongue 33 is flat and straight and said tongue 33 terminates at one end in a cylindrical threaded shank 34. The end of the tongue 33 opposite to the shank 34 is welded or otherwise rigidly secured to a flat section 35 of an ejector plate, indicated generally by numeral 36. The tongue 33 is slidable within the slot 32 but rotary movement between parts 33 and 22 is prevented.

The ejector plate 36 comprises a handle part or thumb plate 37, an upwardly arched loop part 38 which serves as a thumb piece, an upright part 40 which connects the loop part 38 with the flat section 35, and an outer pusher bar portion 41 which carries a pusher member 42. The pusher bar portion 41 lies close to and is curved so that it conforms, in a general way, to the curvature of the shank 14 of the fork.

A helical compression spring 43 is provided on the tongue 33 within the bracket 22. A long, externally cylindrical, tubular nut 44 is threaded onto the shank 34 and has a head 45 which serves as a spring abutment member for one end of the spring 43. The other end of said spring rests against end part 25 of bracket 22. The spring supporting tongue 33 is inserted through the slot 22 before it is secured to part 35 of ejector plate 36. The slot 32 allows for enough angular movement of bracket 22 relative to tongue 33 to afford easy access to the nut 44 for the purpose of threading it onto and off of the shank 34 in initially placing a spring 35 on the member 33 or in changing springs on said member 33.

The pusher member 42 can be integral with the outer end of the pusher bar part 41 or it can be separately made and rigidly attached to said part 41. Said pusher member has two spaced apart perforations 46 which slidably receive the two tines 16 of the fork. Preferably the metal in which the perforations 46 are formed is first displaced or pushed inwardly to form a concavo-convex bulge and the perforations 46 are then formed in these bulged portions so that short inwardly protruding sleeves 47 are provided as guides for the fork tines 16. These sleeves allow for a little more outward food ejecting movement of the pusher member 42 than would be allowed if no such sleeves were provided. Also preferably the pusher member 42 is curved so that its outermost side is convex and this helps in enabling the user to push material a little further outwardly on the tines 16 and substantially clear of the ends of said tines.

The spring supporting clip 22 is readily attachable to and detachable from the handle 15. Thus the ejector mechanism can be easily removed for cleaning, making it sanitary. The spring 43 normally holds the ejector parts in a retracted position. To use the utensil the user grasps the handle portion of the same with his thumb resting on the thumb plate 37 and against the upstanding thumb piece 38 and with the forefinger hooked around the downwardly curved finger engaging hump 17. This provides a firm hold on the utensil so the user can readily pick up food with the tines 16 and by a pushing movement of the thumb discharge the food from said tines. Thus foods which tend to cling to the tines can be ejected without difficulty and with less danger of dropping them. If desired the thumb plate 37 may be roughened or longitudinally corrugated to reduce liability of the thumb slipping sidewise thereon.

FIGS. 9, 10 and 11 show my ejector devices applied to a spoon which comprises a scoop shaped bowl 50, a handle shank 49, and a flat handle 51, all of conventional size and shape. The bowl 50 is of approximately uniform arcuate cross sectional shape throughout the major position of its length and the outer end of said bowl is rounded, transversely considered, but is not upwardly curved. This provides a bowl which is easy to make, convenient and efficient in use, well shaped to receive and support a movable ejector member, and one from which material which tends to stick to the bowl can be readily ejected.

An ejector plate having parts 37′, 38′, 40′, 35′ and 41′ similar to previously described parts 37, 38, 40, 35 and 41 is provided in the device shown in FIGS. 9, 10 and 11. A distinctively shaped pusher member 52 is provided on the outer end of the pusher bar 41′. Said member 52 is shaped to conform to the cross sectional shape of the spoon bowl 50 and is provided with an arcuate slot 53 which receives and is slidable on the bowl 50. Preferably the pusher member 52 is curved similarly to the pusher member 42 so that its outer side is convex.

The spoon handle 51 has a downwardly curved hump 54 forming a finger hold and said handle 51 is provided with two perforations 55 and 56. The parts 54, 55 and 56 correspond to the parts 17, 18 and 19 of FIGS. 1, 2 and 3 and are similarly positioned. A catch member or lug 57, which corresponds to lug 20 but is longer than lug 20 and extends above the plane of the spoon handle 51 is provided at one edge of the perforation 55. A spring supporting bracket comprising parts 23′, 24′ and 25′ is adapted to be detachably secured to the spoon handle 51. The bracket parts 23′ and 25′ are identical with the previously described parts 23 and 25. The part 24 is of modified shape to adapt it to be engaged with and disengaged from the catch member 57 by sidewise swinging movement of the spring supporting bracket instead of pressing it straight down, as is done with the bracket 22. The end 24′ has a transversely grooved part 60 which fits over and receives the end of the catch member 57 and can be engaged with and detached from said catch member 57 by sidewise swinging movement of the spring supporting bracket, as indicated by dot and dash lines in FIG. 9. The end part 24′ does not have any shoulders corresponding to the shoulders 27 of the bracket 22 and the tip of said part 24′ does not enter the perforation 55 but is substantially flush with and can contact the upper surface of the spoon handle. A spring supporting tongue 61, spring 62 and nut 63, similar to previously decribed parts 33, 43 and 44, are provided in the device shown in FIGS. 9 and 10. The ejector device shown in FIGS. 9, 10 and 11 operates in substantially the same manner, in ejecting material from the bowl 50, as the device shown in FIGS. 1 to 8 does in ejecting material from the tines 16.

FIG. 12 shows an adaptation of my invention to a fork or spoon comprising a shank 66 having its inner end portion 65 imbedded in a hand hold member 67 of non-metallic material, such as molded plastic. Many barbecue forks and other long forks and spoons used for dishing up and serving food are of this type. I apply my ejecting means to the fork or spoon shown in FIG. 12 by securing to the top side of the handle 67 a thin, straight, flat, longitudinally extending mounting plate 69. The ends of the mounting plate 69 are attached, respectively, by screws 70 and 71 to the handle member 67 and shank 66. Two performations 72 and 73 near the respective ends of the mounting plate 69 function in the same manner as the previously described perforations 18 and 19 in handle 15 to receive snap-in lugs 74 and 75 respectively on the ends of a spring supporting bracket 76 similar to the spring supporting bracket 22. The bracket 76 cooperates in receiving and supporting a spring 77 and tongue 79 similar to the spring 43 and tongue 33. The outer end of the tongue 79, shown at the right, is rigidly connected with and may be an integral part of a pusher bar 90. The pusher bar 90 is preferably round in cross section, can be any desired length, and terminates in a downwardly bent, flattened outer end part 91 which has a pusher member 92 secured thereto. The pusher member 92 may be similar either to the pusher member 42 or 52. A thumb plate 94 has an outer end portion 95 rigidly secured to the pusher bar 90 and tongue 79. The major portion of said thumb plate 94 is generally parallel with and close to the top side of the bracket 76 and is provided with preferably two spaced apart upwardly arched thumb engaging humps 96 and 97. It has been found that some users, particularly those with small hands, find it more convenient to use the thumb engaging hump 96 nearest to the inner end of the thumb plate 94. The end 67′ of the hand hold member 67 provides a shoulder with which the forefinger can be engaged to give the user a better grip and facilitate moving the pusher bar 90 outwardly. The terminal portion 94′ of the thumb plate 94 preferably rests slidably on the bracket 76 at the time the thumb plate 94 is being moved outwardly and this gives a more firm resistance to downward thumb pressure and makes for ease of operation.

The utensil disclosed in FIG. 12 functions in the same manner as the ones disclosed in FIGS. 1 to 11 inclusive.

The foregoing description and accompanying drawings clearly disclose preferred embodiments of my invention but it will be understood that changes may be made within the scope of the following claims.

I claim:

1. The combination with a culinary utensil having a handle connected by a shank with a food supporting part, of ejector mechanism comprising a pusher member slidably mounted on said food supporting part; a pusher bar rigid with said pusher member and extending inwardly along said shank toward said handle; a flat metal spring supporting bracket including a relatively long flat main part having two relatively short flat end members extending in the same direction therefrom, said end members terminating in readily attachable and detachable handle engaging means and one of said end member having a perforation therein; a tongue rigid with said pusher bar extending through said perforation into said bracket; a spring abutment member rigid with the inner end portion of said tongue; a compression spring on said tongue between said spring abutment member and an end member of said bracket urging said tongue and pusher bar and pusher member into a retracted position; a flat thumb plate rigid with said pusher bar and extending along the upper side of the main part of said bracket in close proximity to said bracket toward the inner end of said handle; and an upwardly arched hump in said thumb plate whereon an outward thrust can be exerted in moving said pusher bar and pusher member outwardly.

2. The apparatus as claimed in claim 1 in which the perforation in an end part of the bracket is a slot of greater length than width, and the tongue which operates in said slot is flat and of generally rectangular cross sectional shape and freely movable longitudinally but restrained against rotary movement in said slot.

3. In an ejector type culinary utensil, a handle including a thin flat part having therein two longitudinally spaced apart perforations; a shank rigid with said thin flat handle part and extending outwardly therefrom; a food supporting part rigid with the outer end of said shank, a spring supporting bracket of flat metal composed of a relatively long flat main part having two relatively short flat end members extending in the same direction therefrom, one of said end members having a perforation therein; pawls on said end members capable of releasably engaging with said flat handle part at the locations of said perforations in said handle part in detachably securing said bracket to said handle part with the main part of said bracket spaced outwardly from said thin flat handle part; a pusher member slidably supported on said food supporting part; a pusher bar rigid with said pusher member and extending inwardly along said shank toward said handle part; a tongue rigid with said pusher bar extending through said perforation in the end member of said bracket; spring abutment means rigid with the inner end portion of said tongue; a compression spring on said tongue within said bracket expansively disposed between said abutment means and the slotted end of said bracket urging said pusher bar and pusher member into a retracted position; a flat metal thumb plate rigid with said pusher bar and extending inwardly along the upper side of the main part of said bracket toward the inner end of said handle part; and an upwardly protruding thumb piece carried by said thumb plate.

4. The apparatus as claimed in claim 3 in which a downwardly extending finger hold member is rigid with said thin flat handle part and said shank substantially at the location where said thin flat handle part and said shank are connected together.

5. The apparatus as claimed in claim 3 in which the thin flat handle part and the shank are of one piece integral construction and are provided at the location where they join with a transversely extending downwardly bent loop forming a finger hold, and in which the thumb piece carried by the flat metal thumb plate is a transversely extending upwardly bent loop.

References Cited by the Examiner
UNITED STATES PATENTS

| | | | |
|---|---|---|---|
| 858,429 | 7/1907 | Webb | 30—129 |
| 2,483,546 | 10/1949 | Kaminski | 30—129 |

FOREIGN PATENTS

| | | |
|---|---|---|
| 802,830 | 2/1951 | Germany. |

References Cited by the Applicant

| | | |
|---|---|---|
| 439,432 | 10/1890 | Schoch. |
| 1,172,333 | 2/1916 | Williams. |
| 1,343,811 | 6/1920 | Denman. |
| 1,678,368 | 7/1928 | Thomas. |
| 2,521,032 | 9/1950 | Becker. |
| 2,873,522 | 2/1959 | Homola. |

WILLIAM FELDMAN, *Primary Examiner.*

R. V. PARKER, JR., *Assistant Examiner.*